United States Patent
Kitani

(10) Patent No.: US 7,957,576 B2
(45) Date of Patent: Jun. 7, 2011

(54) IMAGE PROCESSING APPARATUS, IMAGE PROCESSING METHOD, AND IMAGE PROCESSING PROGRAM

(75) Inventor: Hideyuki Kitani, Kawasaki (JP)

(73) Assignee: Canon Kabubshiki Kaisha, Tokyo (JP)

( * ) Notice: Subject to any disclaimer, the term of this patent is extended or adjusted under 35 U.S.C. 154(b) by 957 days.

(21) Appl. No.: 11/833,834

(22) Filed: Aug. 3, 2007

(65) Prior Publication Data

US 2008/0130942 A1    Jun. 5, 2008

(30) Foreign Application Priority Data

Dec. 5, 2006   (JP) ................................ 2006-328524

(51) Int. Cl.
*G06K 9/00*   (2006.01)
(52) U.S. Cl. ....................................... 382/135; 382/137
(58) Field of Classification Search .................. 382/100, 382/135, 137
See application file for complete search history.

(56) References Cited

U.S. PATENT DOCUMENTS

| | | | |
|---|---|---|---|
| 7,505,606 B2 * | 3/2009 | Lin et al. | 382/100 |
| 7,627,161 B2 * | 12/2009 | Shimizu et al. | 382/135 |
| 7,630,559 B2 * | 12/2009 | Ito et al. | 382/209 |
| 2008/0060079 A1 | 3/2008 | Shimizu et al. | |

FOREIGN PATENT DOCUMENTS

WO    2006/016622 A    2/2006

\* cited by examiner

*Primary Examiner* — Tom Y Lu
(74) *Attorney, Agent, or Firm* — Canon USA Inc IP Division

(57) ABSTRACT

Data representing a sheet of document is obtained. Then, an area where it is possible to obtain a paper fingerprint from the obtained data representing the sheet of document is determined, and a paper fingerprint intensity of the sheet of document is calculated based on a number of areas of one or more paper fingerprint obtaining patterns allocated in the area where it is possible to obtain a paper fingerprint. Furthermore, a result of the calculation is reported to a user.

18 Claims, 11 Drawing Sheets

FIG. 10
| POINTS BASED ON SHEET FINGERPRINT AREA | FINGERPRINT INTENSITY |
|---|---|
| GREATER THAN OR EQUAL TO 10.0 | RANK A |
| 5.0 ~ 9.5 | RANK B |
| 2.0 ~ 4.5 | RANK C |
| 0.5 ~ 1.5 | RANK D |
| 0.0 | RANK E |
FIG. 11
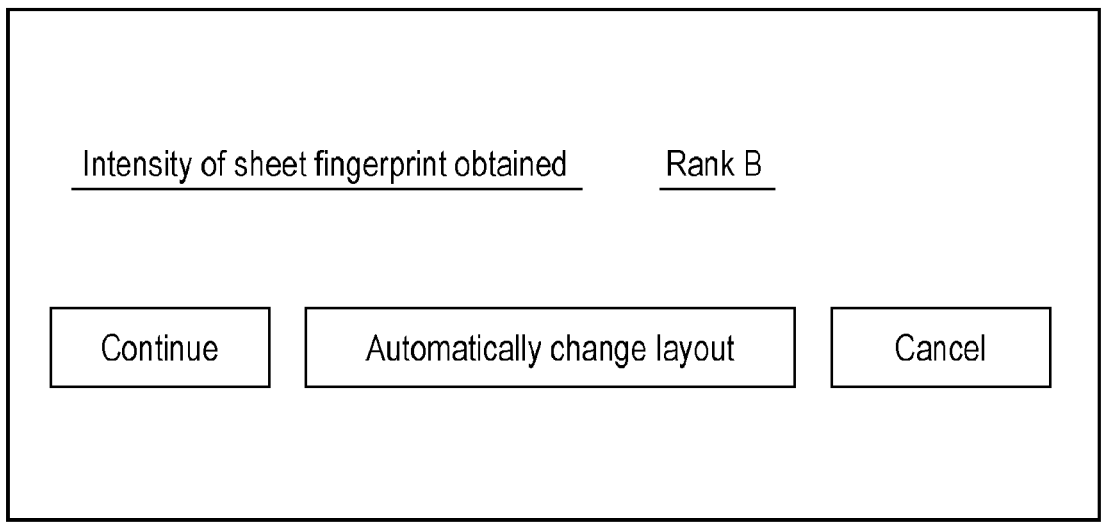
FIG. 12
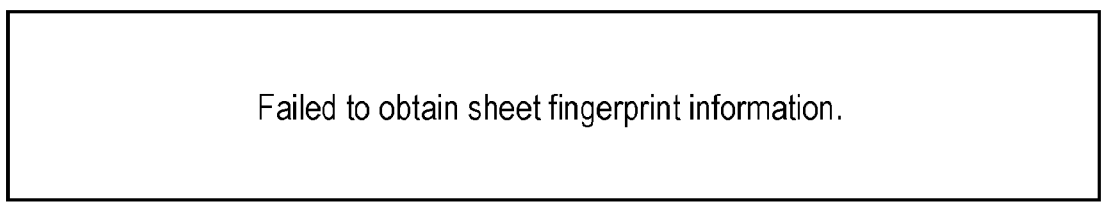

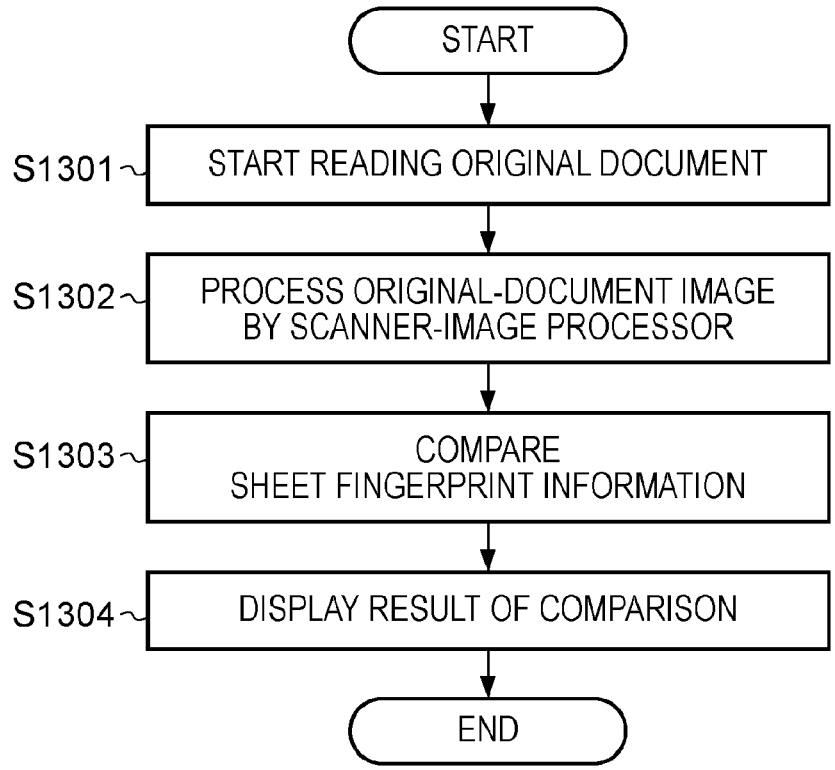
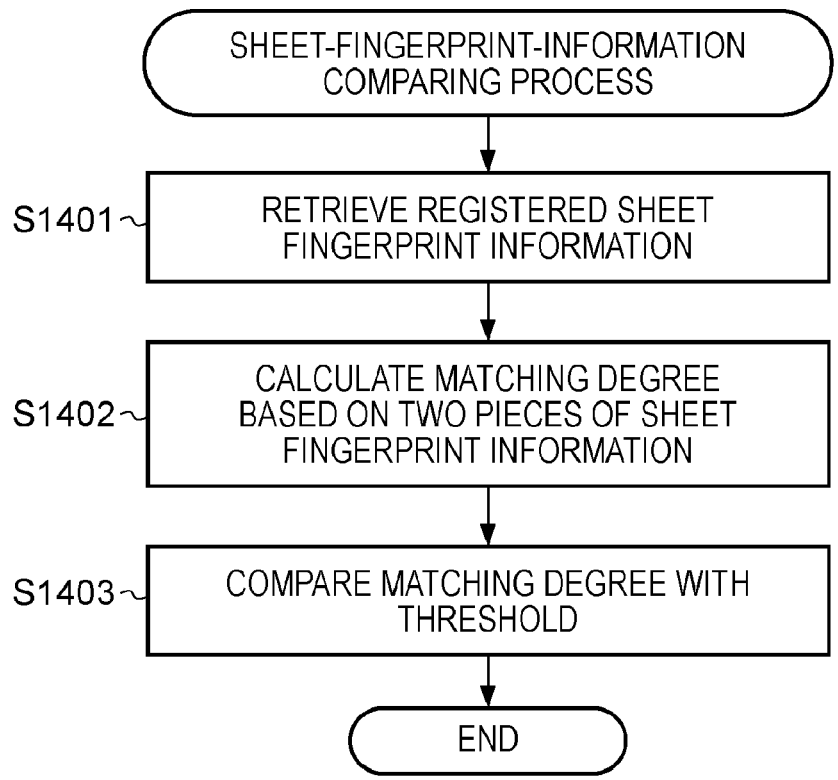

IMAGE PROCESSING APPARATUS, IMAGE PROCESSING METHOD, AND IMAGE PROCESSING PROGRAM

BACKGROUND OF THE INVENTION

1. Field of the Invention

The present invention relates to an image processing apparatus, an image processing method, an image processing program, and a storage medium storing an image processing program with which it is possible to deal with feature information that is unique to individual sheets of printed documents (hereinafter referred to as paper fingerprints).

2. Description of the Related Art

Recently, the quality of printed copies has improved due to color printing functions and enhanced resolutions of copying machines, so that it is often difficult to distinguish an original from a copy by the naked eye. Thus, techniques for distinguishing an original from a copy on the basis of features of fiber patterns of individual sheets have been proposed. This serves to prove the authenticity or inauthenticity of a sheet of document, assure originality, or facilitate management.

In this case, a sheet of document that is to be managed as an original is scanned by a scanner, and a slight shade pattern of fibers of the sheet is registered as a feature specific to the sheet, or the pattern is written to the sheet itself depending on cases. The feature specific to the sheet is considered as information unique to each sheet, similar to a human fingerprint. This feature or information derived from the feature will be referred to herein as a paper fingerprint.

In a conventional system, when information has already been printed on a sheet of document, a blank area where information is not printed on the sheet of document is detected, and a fiber pattern in the area of the sheet is read to extract a fiber pattern feature.

In order to extract a feature of a fiber pattern unique to each sheet, a blank area of a certain size is desired. For example, when the resolution of a scanner is 600 dpi, assuming a sheet of an ordinary material, usually, a blank area of 512 pixels× 512 pixels, i.e., 22×22 mm, may be used as a paper fingerprint area. As the size of the paper fingerprint area for extracting a feature increases, it is more likely that information unique to each sheet can be extracted. This reduces the possibility of incorrectly recognizing different sheets as the same sheet. That is, the probability of obtaining the same result as a previous result increases when a feature is extracted again.

Furthermore, if a paper fingerprint is extracted from only one area, the result of subsequent extraction of a paper fingerprint could differ from the result of the first extraction due to, for example, dirt, scar, or intentional writing that may be present on the sheet after obtaining a paper fingerprint. Thus, it is desired to define a plurality of paper fingerprint areas on one sheet to deal with such cases. By defining a plurality of paper fingerprint obtaining areas on one sheet, the probability of proper conservation and maintenance of at least one of the paper fingerprint obtaining areas is improved. A value indicating the probability of proper conservation and maintenance will be referred to as a paper fingerprint intensity.

As described earlier, as the number of areas on the sheet where paper fingerprints can be obtained increases, the paper fingerprint intensity for assuring originality increases. That is, as the number of areas where paper fingerprints can be obtained decreases, the paper fingerprint intensity for assuring originality decreases, so that the sheet is not suitable for an important document that requires originality assurance.

However, in a conventional system, when a user causes a scanner or the like to read a paper fingerprint for originality assurance, the degree of paper fingerprint intensity of the relevant sheet of document is not recognized. Thus, if the intensity of a paper fingerprint obtained is low, it is likely that recognition of the original fails when the originality is checked later. Furthermore, in an extreme case, when a background or a copy-forgery-inhibited pattern is printed over the entire surface of a sheet so that it is not possible to obtain a paper fingerprint in any area, recognition of the original could fail when the originality is checked later. As a result, it is possible that the user is able to register a sheet of document in a conventional originality assurance system even though it may not be possible to obtain a paper fingerprint with a sufficient intensity from the sheet of document, so that recognition of the original could fail when the originality is checked later.

SUMMARY OF THE INVENTION

An embodiment of the present invention provides an image processing apparatus, an image processing method, an image processing program, and a storage medium storing an image processing program with which it is possible to prevent a sheet of document with a low paper fingerprint intensity from being registered as an original when the original is created in a system for assuring originality.

According to an aspect of the present invention, an embodiment is directed to an image processing apparatus including a data obtaining unit configured to obtain data representing a sheet of document; a calculating unit configured to determine an area where it is possible to obtain a paper fingerprint from the obtained data representing the sheet of document, and to calculate a paper fingerprint intensity of the sheet of document based on a number of areas of one or more paper fingerprint obtaining patterns allocated in the area where it is possible to obtain a paper fingerprint; and a paper fingerprint intensity reporting unit configured to report a result of the calculation.

Further features of the present invention will become apparent from the following description of exemplary embodiments with reference to the attached drawings.

BRIEF DESCRIPTION OF THE DRAWINGS

FIG. 10 is a diagram showing relationship between points corresponding to calculated paper fingerprint intensities and ranks thereof.

FIG. 11 is an illustration showing an example of a display screen for presenting a paper fingerprint intensity to a user.

FIG. 12 is an illustration showing an example of a display screen on the operating unit indicating a failure to obtain a paper fingerprint.

FIG. 13 is a flowchart diagram for explaining a process of checking whether a paper fingerprint of a sheet of document matches a paper fingerprint registered in a database.

FIG. 14 is a flowchart diagram of a paper fingerprint comparing process executed by the CPU or the controller unit.

DESCRIPTION OF THE EMBODIMENTS

Now, embodiments of the present invention will be described with reference to the drawings.

As will be understood from the preceding description, a system including an image processing apparatus according to an embodiment at least includes a scanner that is capable of scanning an original document to obtain a sheet surface image of regions other than regions where information is printed. Furthermore, the system also includes a processor that processes a paper fingerprint obtained from the image read by the scanner, a user interface including a display and operation buttons, and an external database in which the paper fingerprint is registered. Furthermore, the image processing apparatus according to this embodiment may be an image forming apparatus including the scanner, the processor, and the user interface described above.

First, the system including the image processing apparatus according to this embodiment will be described. The image processing apparatus according to this embodiment may be of various types. However, for simplicity of description, the following description will be given in the context of an example where the image processing apparatus is an image forming apparatus having a scanner and a printer.

System to Which an Embodiment can be Applied

Figure 1:
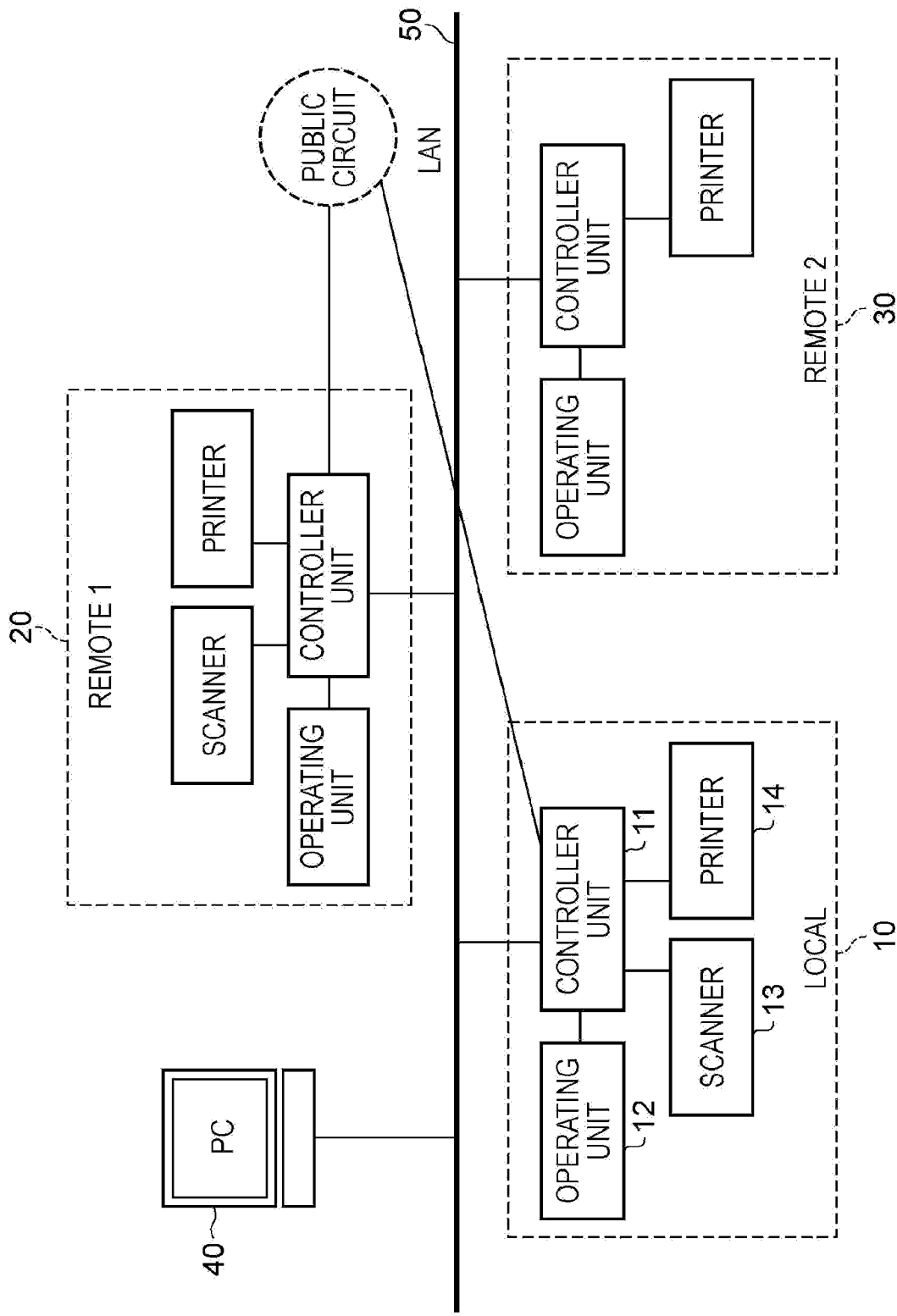
FIG. 1 is a diagram showing the configuration of an image forming system according to an embodiment of the present invention.

FIG. 1 is a block diagram showing an example configuration of an image forming system according to an embodiment of the present invention. In the illustrated system, a host computer 40 and a plurality of image forming apparatuses 10, 20, and 30 are connected to a local area network (LAN) 50. However, the number of image forming apparatuses that are connected is not limited to three. Furthermore, although a LAN is used for connection in the illustrated embodiment, without limitation to a LAN, any type of network, such as a wide area network (WAN) (public circuit), a serial transmission bus, such as a USB bus, or a parallel transmission bus, such as a Centronics bus or a SCSI bus, or the like may be used.

The host computer (hereinafter referred to as a PC) 40 has functions of a personal computer. The PC 40 can exchange files or e-mails via the LAN 50 or a WAN according to the File Transfer Protocol (FTP) or the Server Message Block (SMB) protocol. Furthermore, the PC 40 can issue print instructions to the image forming apparatuses 10, 20, and 30 via a printer driver.

The image forming apparatuses 10 and 20 are configured the same with each other. The image forming apparatus 30 only has a printing function, and does not have a scanner, which is provided in each of the image forming apparatuses 10 and 20. In the following description, for simplicity, of the image forming apparatuses 10 and 20, the configuration will be described in detail with regard to the image forming apparatus 10.

The image forming apparatus 10 or 20 can serve as the image processing apparatus according to an embodiment, the host computer 40 or a device connected to a public circuit can be used as a database. In the following description, since a large amount of paper fingerprint data is used in order to check matching of paper fingerprints reliably, it is basically assumed that paper fingerprint data is registered in a database. Furthermore, it is assumed that a sheet of document prepared in advance or print data transmitted via the LAN exists.

A paper fingerprint refers to an image representing a pattern of sheet fibers that is unique to the sheet of the document, or feature information associated with the image. A paper fingerprint may also refer to a surface image or transparent image of the sheet, or feature information associated with the image.

In the following description, for simplicity, of the image forming apparatuses 10 and 20, the configuration will be described in detail with regard to the image forming apparatus 10.

The image forming apparatus 10 includes a scanner 13, which is an image input device, a printer 14, which is an image output device, a controller unit 11, and an operating unit 12, which serves as a user interface (UI). The controller unit 11 controls the overall operation of the image forming apparatus 10. The operating unit 12 has a touch-panel display.

Image Forming Apparatus 10

Figure 2:
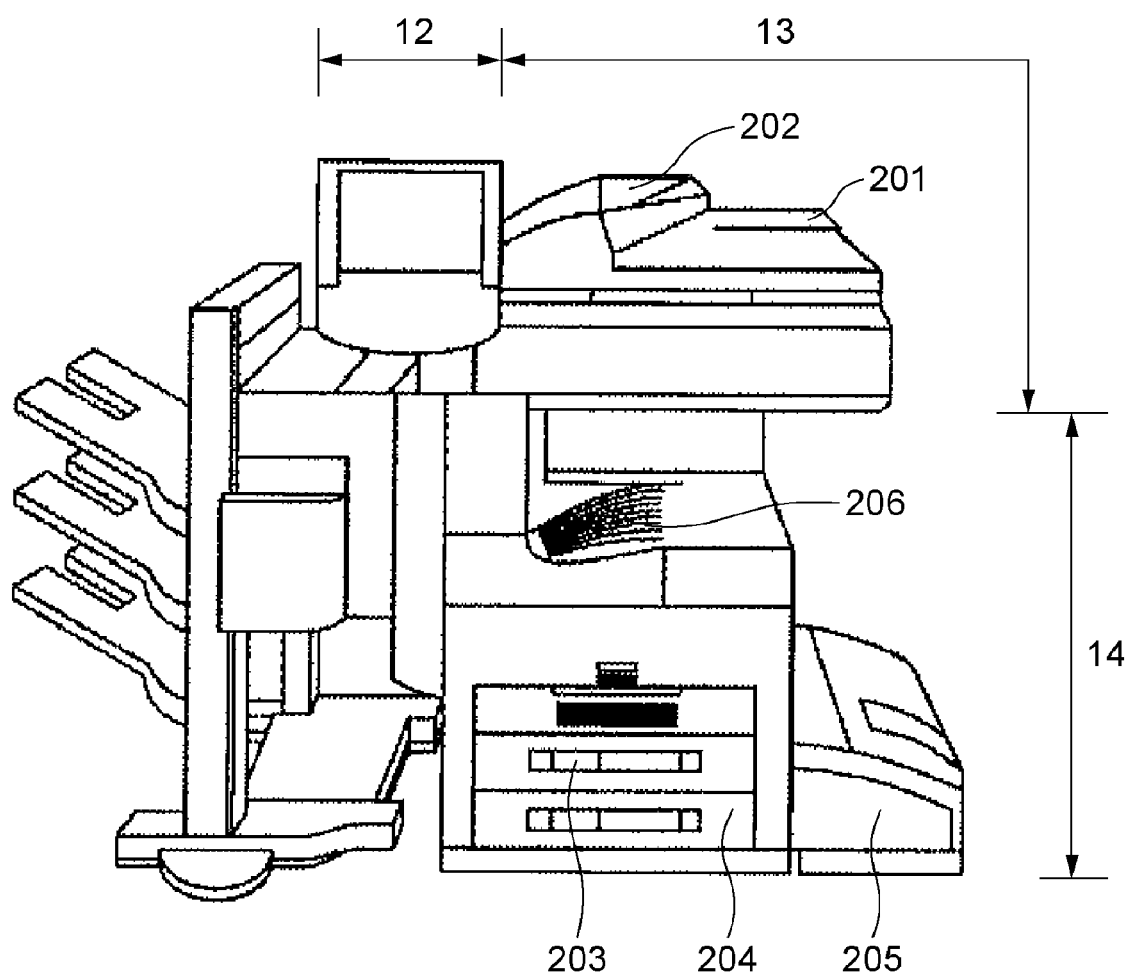
FIG. 2 is a diagram showing the appearance of an image forming apparatus shown in FIG. 1.

FIG. 2 shows an external view of the image forming apparatus 10. The scanner 13 includes a plurality of charge coupled devices (CCDs) that scan individually assigned portions of a region to be scanned. If the sensitivities of the individual CCDs vary, even if the intensities of some pixels on an original document are the same, the intensities of the pixels are recognized as different intensities. Thus, the scanner first exposes and scans a uniformly white plate, converts the amounts of reflected light into electric signals, and outputs the electric signals to the controller unit 11. As will be described later, a shading correction unit 500 in the controller unit 11 recognizes the difference among the sensitivities of the individual CCDs on the basis of the electric signals obtained from the individual CCDs. Then, the values of electric signals obtained by scanning an image on the original document and input to an A/D converter provided at a preceding stage of the shading correction unit 500 (pf 5) are corrected by a gain adjusting unit provided at a preceding stage of the A/D converter. Furthermore, the shading correction unit 500 adjusts receives gain adjustment information received from a central processing unit (CPU) 301 in the controller unit 11, which will be described later, and controls the gain adjusting unit so that the gain is controlled according to the gain adjustment information. The gain adjustment serves to adjust how the values of the electric signals obtained by exposing and scanning the original document are converted into the values 0 to 255 of luminance signals. This gain adjustment allows converting the values of the electric signals obtained by exposing and scanning the original document into relatively large values of luminance signals or relatively small values of luminance signals. Next, a configuration for scanning an image on the original document will be described.

In the scanner 13, reflected light obtained by exposing and scanning the image on the original document is input to the CCDs to convert image information into electric signals. Furthermore, the electric signals are converted into luminance signals of RGB color components, and the luminance signals are output to the controller unit 11 as image data.

The original document is set on a tray 202 of an original document feeder 201. When a user issues a reading start instruction from the operating unit 12, the controller unit 11 instructs the scanner 13 to read the original document. Upon receiving the instruction, the scanner 13 feeds sheets of the original document one by one from the tray 202 of the original document feeder 201, whereby the sheets of the original document are read. Instead of automatic feeding by the original document feeder 201, the original document may be read by placing the original document on a glass table (not shown) and scanning the original document by moving an exposure device.

The printer 14 is an image forming device that forms an image corresponding to image data received from the controller unit 11 on a sheet. Although images are formed by electrophotography using a photosensitive drum or a photosensitive belt in an embodiment, the present invention is not limited to these examples. For example, at least one embodiment of the present invention is applicable to ink jet printing, in which ink is ejected from a micro nozzle array to print information on a sheet. Furthermore, the printer 14 has a plurality of sheet cassettes 203, 204, and 205 that allows selection of different sheet sizes or sheet orientations. An ejection tray 206 receives sheets that are ejected after printing.

Detailed Description of the Controller Unit 11

Figure 3:
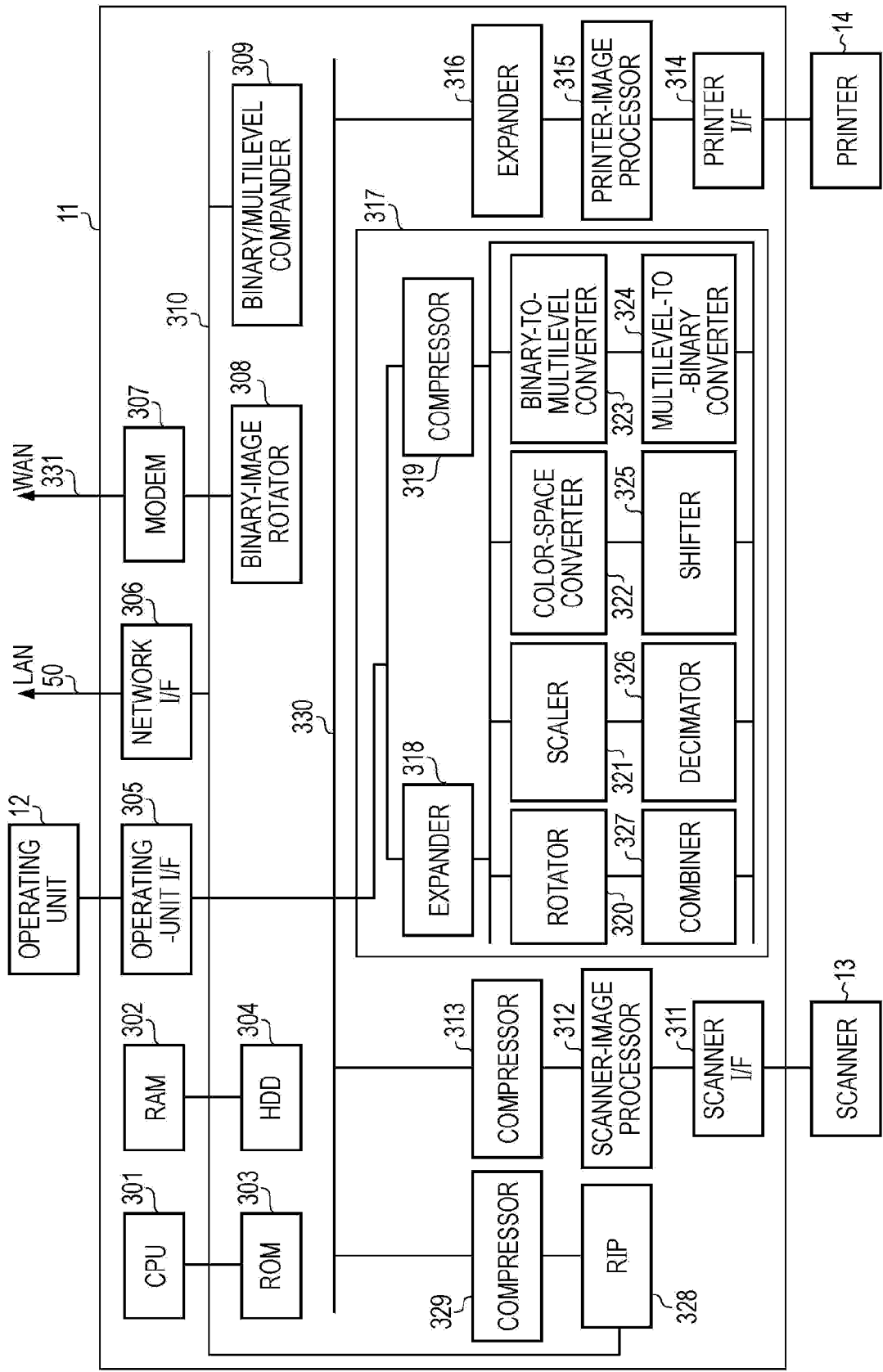
FIG. 3 is a diagram showing a more detailed internal configuration of a controller unit of the image forming apparatus.

FIG. 3 is a diagram showing the configuration of the controller unit 11 of the image forming apparatus 10 in more detail.

The controller unit 11 is electrically connected to the scanner 13 and the printer 14. Furthermore, the controller unit 11 is also connected to the PC 40 and other external devices via the LAN 50 or a WAN 331. Thus, input and output of image data and device information are allowed.

A central processing unit (CPU) 301 exercises overall control on accesses to various devices in connection and also exercises overall control on various processes executed within the controller unit 11 according to control programs or the like stored in a read-only memory (ROM) 303. A random access memory (RAM) 302 is a system work memory for the operation of the CPU 301, and is also used to temporarily store image data. The RAM 302 is implemented by a static RAM (SRAM), which maintains stored content even after it is powered off, and a dynamic RAM (DRAM), with which stored content is discarded when it is powered off. The ROM 303 stores a device boot program or the like. A hard disk drive (HDD) 304 allows storing system software, image data, and so forth.

The operating-unit IF 305 is an interface that connects a system bus 310 to the operating unit 12. The operating-unit IF 305 receives image data for displaying an image on the operating unit 12 from the system bus 310, and outputs the image data to the operating unit 12. Furthermore, the operating-unit IF 305 outputs information input from the operating unit 12 to the system bus 310.

A network I/F 306 is connected to the LAN 50 and the system bus 310 to allow input and output of information. A modem 307 is connected to the WAN 331 and the system bus 310 to allow input and output of information. A binary-image rotator 308 converts the orientation of image data before transmission. A binary-image compander 309 converts the resolution of image data before transmission into a predetermined resolution or a resolution suitable for the capability of a recipient. The binary-image compander 309 executes compression and expansion according to the JBIG, MMR, MR, or MH algorithm. An image bus 330 is used to exchange image data, and is implemented by a PCI bus or an IEEE 1394 bus.

A scanner-image processor 312 corrects, processes, or edits image data received from the scanner 13 via a scanner I/F 311. The scanner-image processor 312 checks whether the received image data represents a color original document or a monochrome original document, a text original document or a picture original document, and so forth. Then, the scanner-image processor 312 attaches information represents the result of checking to the image data. The attached information will be referred to as property data. The processing executed by the scanner-image processor 312 will be described later in detail.

Figure 4:
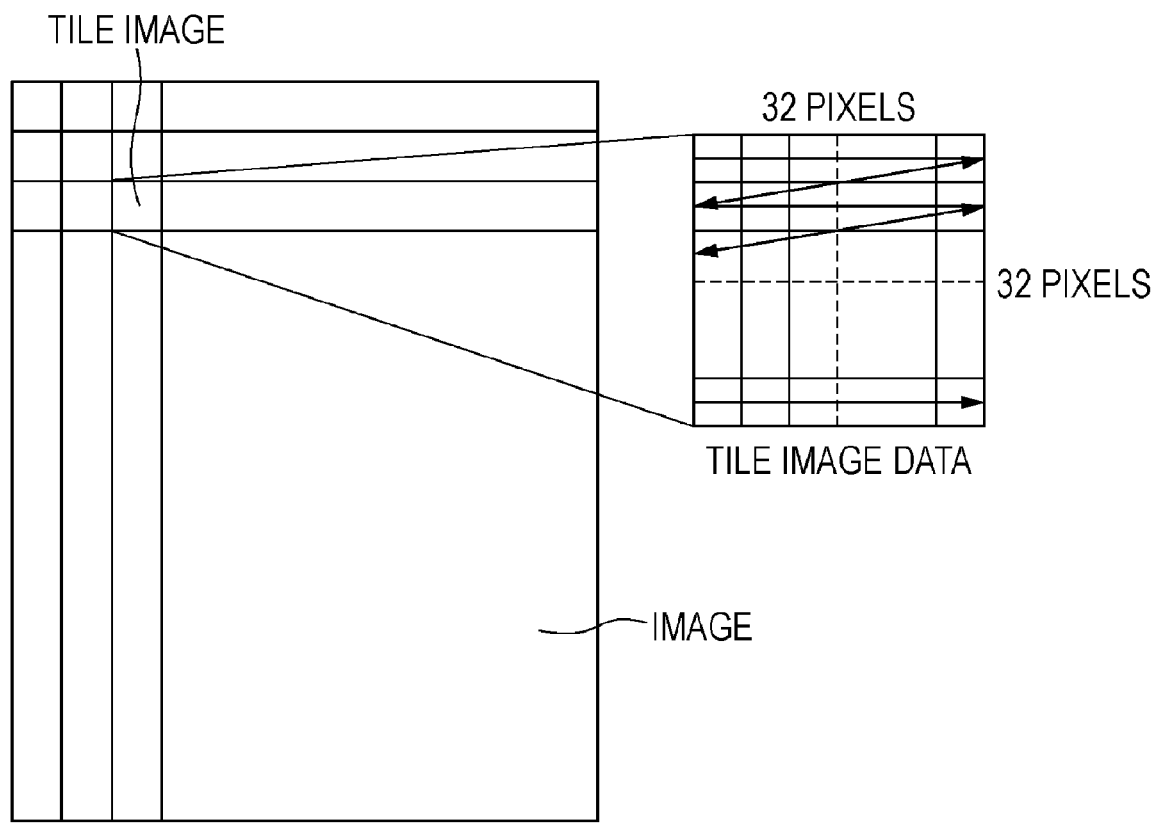
FIG. 4 is a diagram schematically showing tile data of 32×32 pixels used to represent image data in internal processing.

A compressor 313 receives image data, and divides the image data into blocks of 32 pixels×32 pixels. The image data of 32×32 pixels will be referred to as tile data. FIG. 4 schematically shows the tile data. An area of an original document (sheet medium before reading) corresponding to the tile data will be referred to as a tile image. The tile data has attached thereto header information including an average luminance in the block of 32×32 pixels and a coordinate position of the tile image on the original document. Furthermore, the compressor 313 compresses image data composed of a plurality of pieces of tile data. A compressor 329 has the same function as the compressor 313.

An expander 316 expands image data composed of a plurality of pieces of tile data, converts the expanded image data into raster image data, and sends the raster image data to a printer-image processor 315. The printer-image processor 315 receives image data sent from the expander 316, and executes image processing on the image data while referring to property data attached to the image data. The processed image data is output to the printer 14 via a printer I/F 314. The processing executed by the printer-image processor 315 will be described later in detail.

An image converter 317 executes a predetermined conversion on image data. The image converter 317 includes components described below.

An expander 318 expands received image data. A compressor 319 compresses received image data. A rotator 320 rotates received image data. A scaler 321 converts the resolution of received image data (e.g., 600 dpi to 200 dpi). A color-space converter 322 converts the color space of received image data. The color-space converter 322 can execute known background removal using a matrix or a table, known log conversion (RGB to CMY), or known output-color correction (CMY to CMYK). A binary-to-multilevel converter 323 converts received bi-level image data into 256-level image data. Conversely, a multilevel-to-binary converter 324 converts received 256-level image data into binary image data, for example, by error diffusion.

A combiner 327 combines two pieces of received image data to generate a single piece of image data. When combining two pieces of image data, for example, an average of luminance values of pixels to be combined is used as a combined luminance value, or a luminance value of a pixel with a higher luminance level is used as a combined luminance value. Alternatively, a luminance value of a pixel with a lower luminance level may be used as a combined luminance value. Furthermore, a combined luminance value may be determined by logical OR, logical AND, exclusive OR, or the like using pixels to be combined.

A decimator 326 decimates pixels of received image data to convert the resolution of the image data, thereby generating image data with the number of pixels reduced to ½, ¼, ⅛, or the like. A shifter 325 adds a margin to or removes a margin from received image data.

A raster image processor (RIP) 328 receives intermediate data generated from page description language (PDL) code data sent from the PC 40 or the like, and generates (multilevel) bitmap data from the intermediate data.

Detailed Description of the Scanner-image Processor 312

Figure 5:
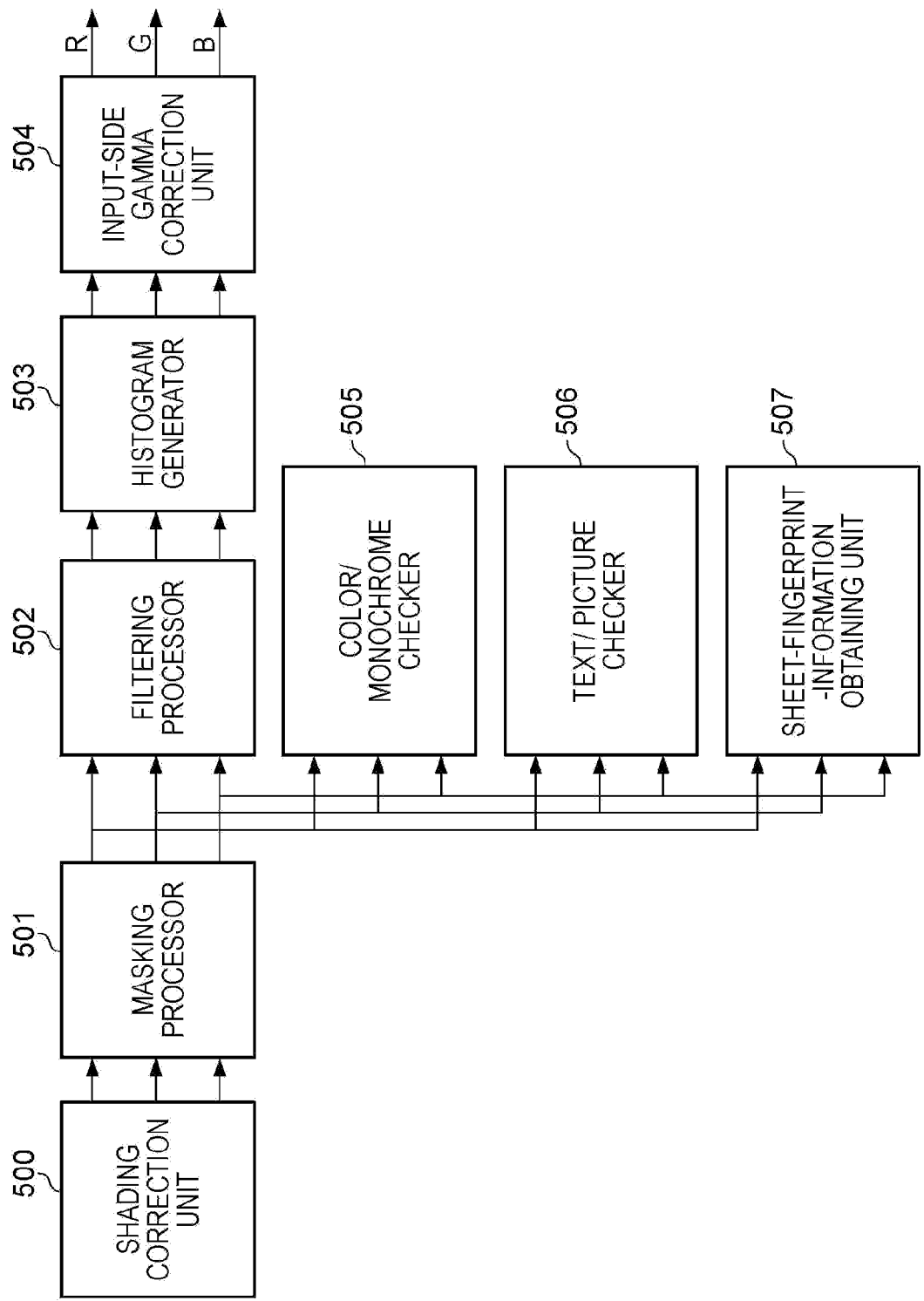
FIG. 5 is a diagram showing the internal configuration of a scanner-image processor.

FIG. 5 shows the internal configuration of the scanner-image processor 312.

The scanner-image processor 312 receives image data composed of luminance signals composed of RGB components each having 8 bits, obtained by adjusting the gain in the gain adjusting unit for signals output from the CCDs in the scanner 13 and executing A/D conversion.

A shading correction unit 500 executes shading correction on the luminance signals. The shading correction serves to prevent incorrect recognition of the luminance levels of the original document due to the variation of the sensitivities of the CCDs as described earlier. Furthermore, as described earlier, the shading correction unit 500 can internally execute shading correction and control the gain in the gain adjusting unit according to an instruction from the CPU 301, thereby adjusting the gain appropriately.

Then, the luminance signals are converted by a masking processor 501 into standard luminance signals that do not depend on the filter colors of the CCDs.

A filtering processor 502 corrects the spatial frequencies of received image data as desired. The filtering processor 502 executes an operation on received image data using, for example, a 7×7 matrix. In a copying machine or a multifunction machine, it is possible to select a copying mode by pressing a tab 704 described later and shown in FIG. 7, such as a text mode, a picture mode, or a text/picture mode. When the text mode is selected by a user, the filtering processor 502 applies a filter for text to the entire image data. When the picture mode is selected, the filtering processor 502 executes a filter for picture to the entire image data. When the text/picture mode is selected, the filtering processor 502 switches the filter that is used for each pixel adaptively according to a text/picture checking signal (a part of property data), which will be described later. That is, it is determined for each pixel whether the filter for picture or the filter for text is to be applied. The filter for picture is configured to have coefficients with which only high-frequency components are smoothed so that the texture of the image will not be rough. On the other hand, the filter for text is configured to have coefficients with which edges are enhanced so that characters will be displayed sharply.

A histogram generator 503 samples luminance data of individual pixels of received image data. More specifically, the histogram generator 503 samples luminance data in a rectangular region defined by start points and end points defined for a main scanning direction and a sub-scanning direction, at predetermined pitches in the main scanning direction and the sub-scanning direction. Then, the histogram generator 503 generates histogram data on the basis of the results of sampling. The histogram data is used to estimate a background level for background removal. An input-side gamma correction unit 504 converts received data into non-linear luminance data using a table or the like.

A color/monochrome checker 505 checks whether each pixel of received image data has a color or is monochrome, and attaches the result of checking to the image data as a color/monochrome checking signal (a part of property data).

A text/picture checker 506 checks whether each pixel of the image data is a pixel constituting a character, a pixel constituting a dot, a pixel constituting a character in dots, or a pixel constituting a flat image, on the basis of the pixel value of the pixel and the pixel values of neighboring pixels. When the pixel does not fall in any of these categories, the pixel is a pixel constituting a white region. Then, the result of checking is attached to the image data as a text/picture checking signal (a part of property data).

A paper fingerprint-information obtaining unit 507 obtains RGB image data input from the shading correction unit 500. Processing that is executed by the paper fingerprint-information obtaining unit 507 will be described later.

Detailed Description of the Printer-image Processor 315

Figure 6:
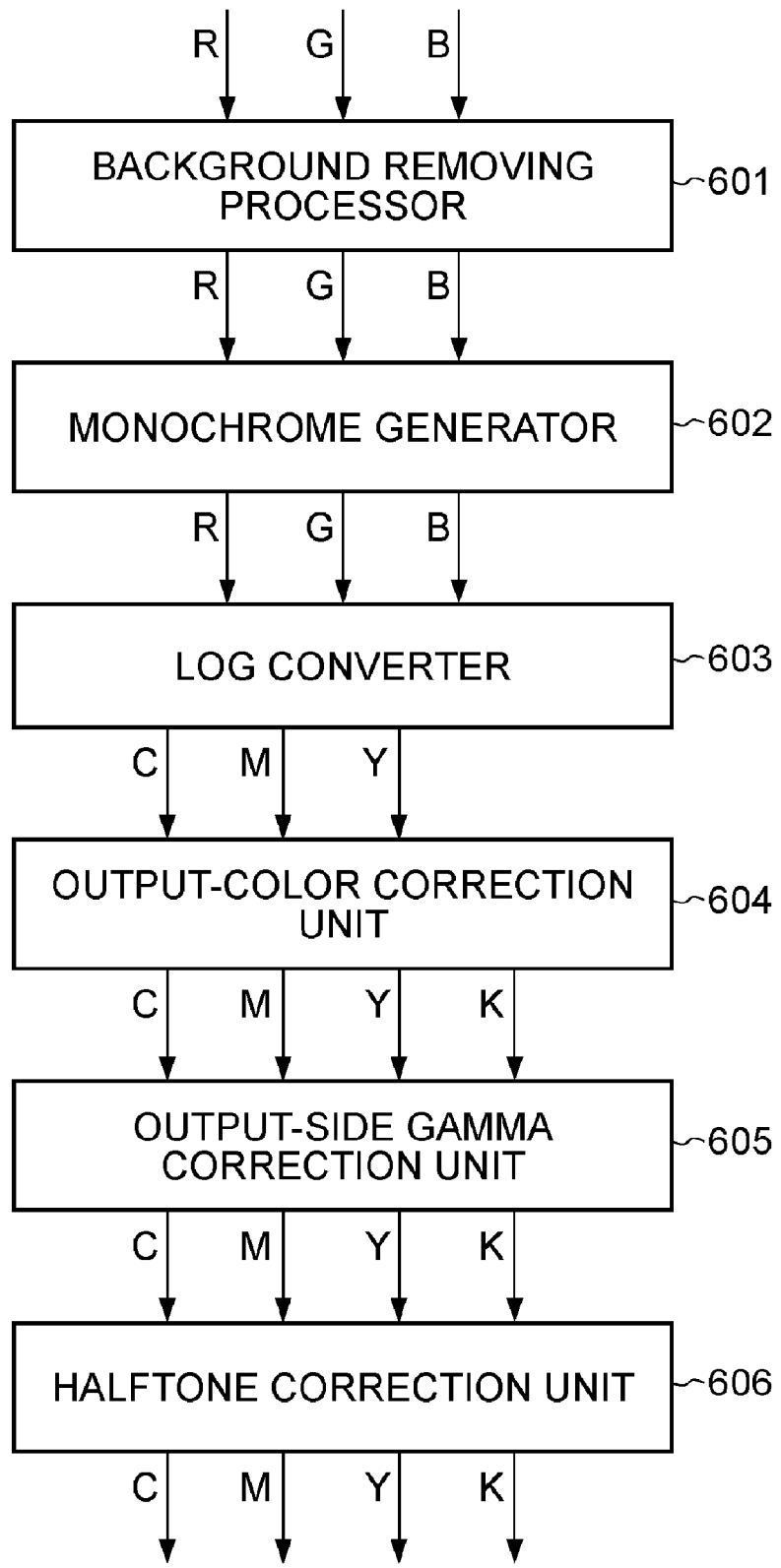
FIG. 6 is a diagram showing the flow of a process executed by a printer-image processor.

FIG. 6 is a diagram showing a flow of processing executed by the printer-image processor 315. Referring to FIG. 6, a background removing processor 601 removes the background of image data using the histogram generated by the scanner-image processor 312. A monochrome generator 602 coverts color data into monochrome data. A log converter 603 executes luminance density conversion. For example, the log converter 603 converts input RGB image data into CMY image data. An output-color correction unit 604 corrects output colors. For example, the output-color correction unit 604 converts input CMY image data into CMYK image data using a table or a matrix. An output-side gamma correction unit 605 executes correction so that the values of intensity of reflection of a copied output become proportional to the values of signals input to the output-side gamma correction unit 605. A halftone correction unit 606 executes halftone processing in accordance with the number of levels that can be represented by a printer used for output. For example, the halftone correction unit 606 converts image data represented with a large number of levels into bi-level or 32-level image data.

Each of the processing units in the scanner-image processor 312 and the printer-image processor 315 can output received image data without processing the image data. Hereinafter, passing data through a processing unit without executing processing therein will be referred to as "passing the data through the processing unit".

Description of Operation Screens

Figure 7:
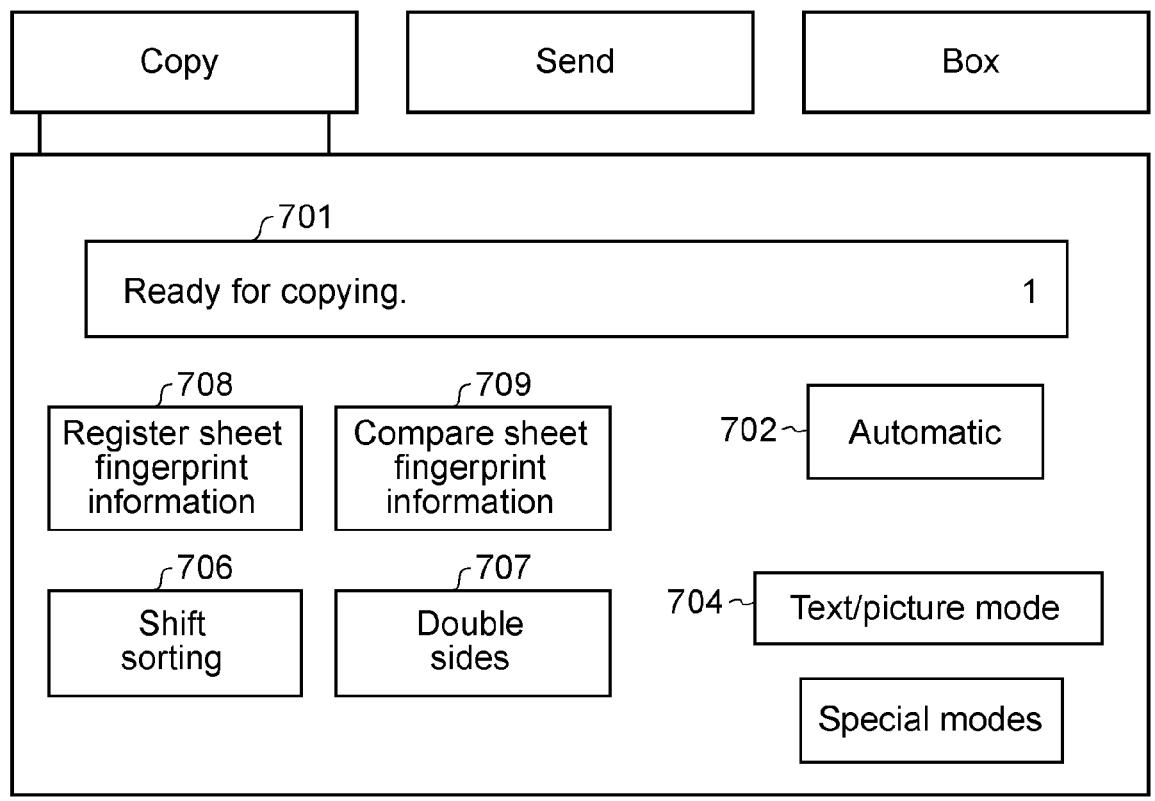
FIG. 7 is an illustration showing an initial screen displayed on a display of an operating unit of the image forming apparatus.

FIG. 7 shows an example of an initial screen on the display of the operating unit 12 of the image forming apparatus 10. A region 701 indicates whether the image forming apparatus 10 is ready for copying and also indicates setting of a number of copies to print. An original-document selection tab 704 is used to select a type of original document. When this tab is pressed, a popup showing a menu of selection from three modes, namely, the text mode, the picture mode, and the text/picture mode, is displayed. A finishing tab 706 is used to specify various setting relating to finishing. A double-side setting tab 707 is used to specify setting regarding double-sided reading and double-sided printing. A reading-mode tab 702 is used to select an original-document reading mode. When this tab is pressed, a popup showing a menu of selection from three modes, namely, the color mode, the black mode, and the automatic (ACS) mode, is displayed. The color mode is selected for color copying, and the black mode is selected for monochrome copying. When the ACS mode is selected, the copying mode is determined according to the monochrome/color checking signal described earlier.

A region 708 is a tab for selecting a paper fingerprint-information registering process. The paper fingerprint-information registering process will be described later. A region 709 is a tab for selecting a paper fingerprint-information comparing process. The paper fingerprint-information comparing process will be described later. The region 708 is also used to select a process for presenting only a paper fingerprint intensity of a sheet of document.

Operation Executed when the Tab (708) for the Paper Fingerprint-information Registering Process is Pressed Next, the paper fingerprint-information registering process, which is executed when the paper fingerprint-information registration tab 708 shown in FIG. 7 is pressed and then a start key is pressed, will be described with reference to FIG. 8.

Figure 8:
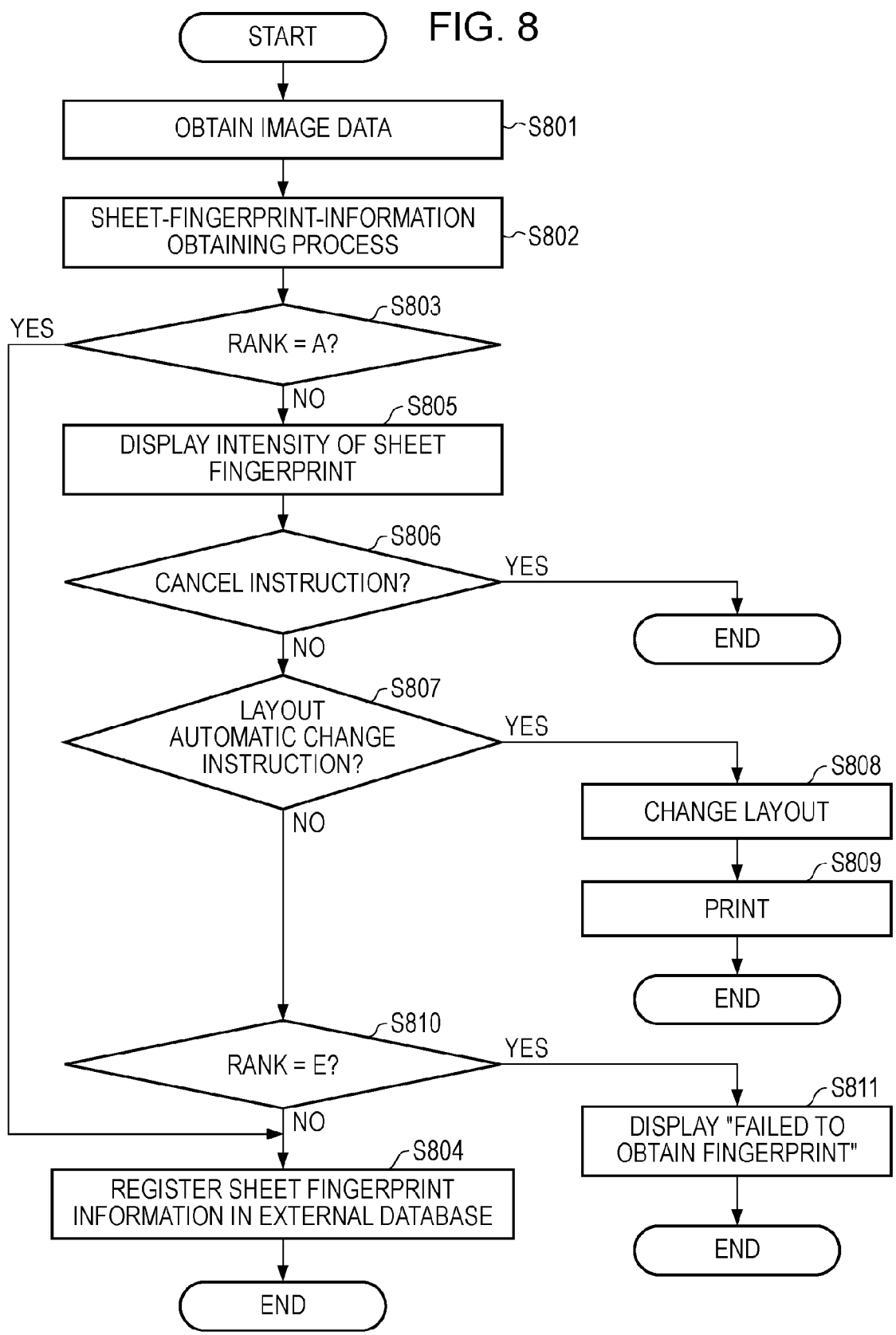
FIG. 8 is a flowchart diagram for explaining a process of presenting a paper fingerprint intensity of a sheet of document and a process of registering paper fingerprint information, executed by a CPU or the controller unit according to an embodiment of the present invention.

FIG. 8 is a flowchart diagram for explaining a case where the CPU 301 or the controller unit 11 presents a paper fingerprint intensity of a sheet of document and registers paper fingerprint information.

In step 801, image data is obtained. In an embodiment, image data is obtained from the scanner 13. Alternatively, for example, bitmap image data, i.e., image data input from an external device (e.g., the PC 40) and output by the printer 14, may be obtained. Yet alternatively, image data input from an external scanner via a communication circuit and stored may be obtained.

In an embodiment, the CPU 301 controls the image forming apparatus 10 so that an original document by the scanner 13 and so that the data of the original document that has been read is transferred to the scanner-image processor via the scanner I/F as image data.

In this case, in response to pressing of the paper fingerprint-information registration tab 708 by a user, instead of reading the original document in a normal mode, the scanner 13 executes reading in a mode in which a feature image of the sheet surface in a region where information is not recorded on the original document is read. At this time, the amount of exposure of the CCDs is controlled so that an image is obtained within an exposure range in which the CCDs exhibit linear sensitivities. More specifically, control is applied to reduce the illumination of the original document or the period of accumulation in the CCDs. However, these types of control need not necessarily be exercised. That is, control need not be exercised to reduce the illumination of the original document or the period of accumulation in the CCDs when an image of the sheet surface can be obtained by normal reading in a range of linear sensitivities that is not in a saturated range. However, in order to extract a surface feature of the sheet accurately, i.e., in order to assure the originality of the sheet with a higher reliability, it is desired to obtain an image of the sheet surface in a more linear range.

Furthermore, in addition to the exposure, the shading correction unit 500 may adjust the gain according to an instruction from the CPU 301. The adjustment serves to keep the maximum value of output from the CCDs within a range of A/D conversion.

Alternatively, in step 801, data transmitted from another scanner via a communication circuit and stored in an internal storage device is obtained.

Then, in step 802, on the basis of the image data obtained, a process of determining a paper fingerprint intensity and a process of obtaining paper fingerprint information are executed. These processes according to an embodiment will be described with reference to FIG. 9.

Figure 9:
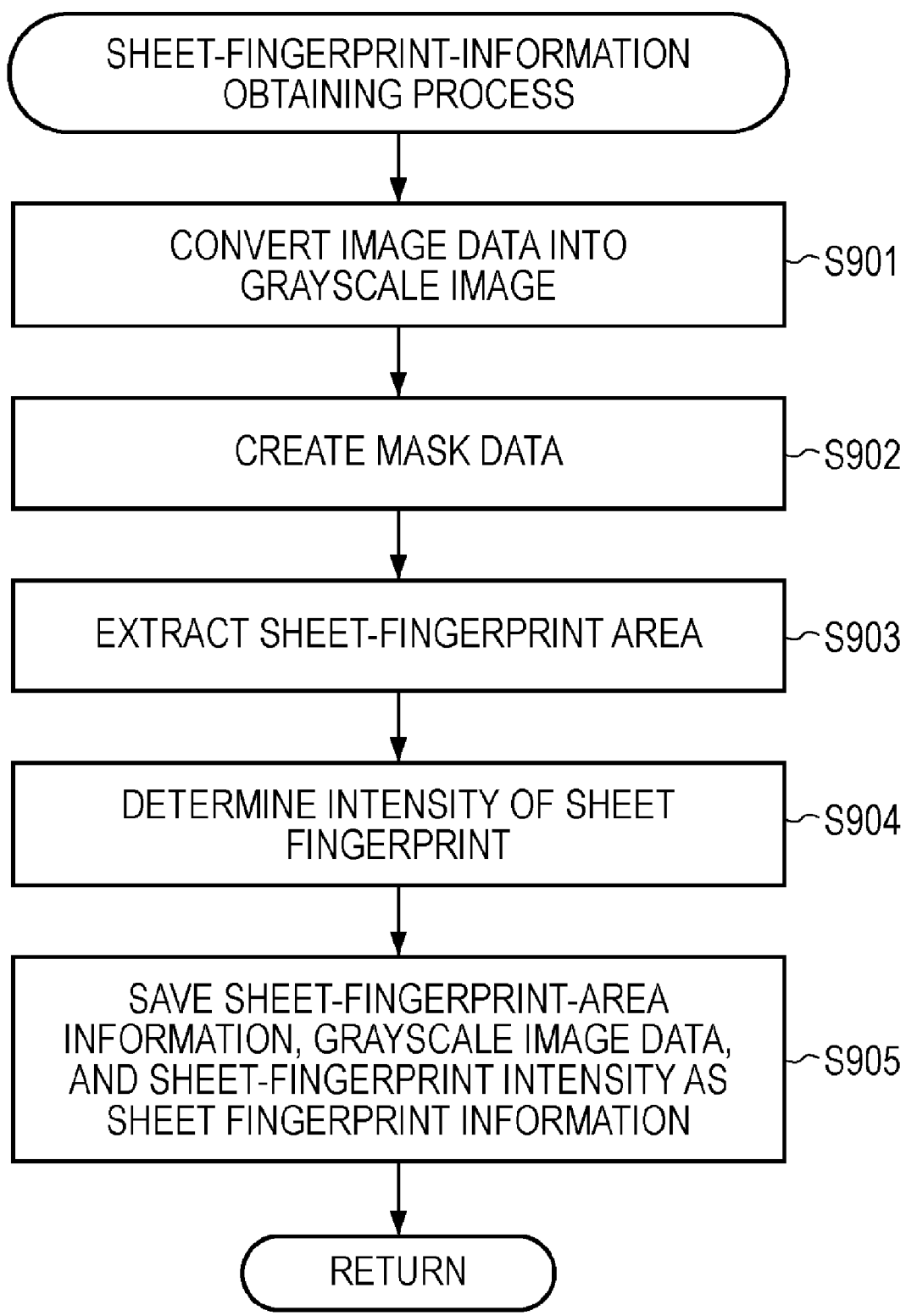
FIG. 9 is a flowchart diagram of a paper fingerprint information obtaining process executed by the CPU or the controller according to an embodiment of the present invention.

FIG. 9 is a flowchart diagram of the paper fingerprint-information obtaining process executed by the CPU 301 or the controller unit 11 using mainly the paper fingerprint-information obtaining unit 507 shown in FIG. 5.

In step 901, image data obtained by the paper fingerprint-information obtaining unit 507 is converted into grayscale image data. In step 902, mask data that is to be used for comparison is generated. In the mask data, elements that could cause incorrect recognition, such as printed or handwritten characters, are removed from an image represented by the grayscale image data obtained in step 901. The mask data is binary data composed of bits each represented by "0" or "1". In the grayscale image data, for each pixel having a luminance value greater (i.e., brighter) than or equal to a first threshold, "1" is set as the value of the mask data. On the other hand, for each pixel having a luminance value less than the first threshold, "0" is set as the value of the mask data. This processing is executed for each pixel included in the grayscale image data.

When the mask data in a certain defined region is composed of all is, the region is a paper fingerprint-obtaining permitted area, i.e., the surface of the sheet in the region is not covered by printed or handwritten letters or the like so that a precise paper fingerprint can be obtained. In the paper fingerprint-obtaining permitted area, it is checked whether an area corresponding to a paper fingerprint obtaining pattern of a predetermined size exists.

In step 903, a paper fingerprint-obtaining permitted area is extracted from the mask data generated in step 902. Considering that regions within a certain distance from the ends of the sheet are likely to be damaged, it is desired that such regions are not included as paper fingerprint-obtaining permitted areas. Then, it is checked whether it is possible to allocate areas of a predetermined paper fingerprint obtaining pattern in the paper fingerprint-obtaining permitted area, and if possible, at which positions the areas can be allocated, and how many areas of the paper fingerprint obtaining pattern can be allocated so as not to overlap each other. In an embodiment, as the predetermined paper fingerprint obtaining pattern, an area pattern composed of 512×512 pixels is used.

In an alternative embodiment, as paper fingerprint obtaining patterns, it is possible to use a plurality of area patterns having the same size but having different shapes. For example, as the paper fingerprint obtaining pattern, area patterns of 512×512 pixels, 256×1024 pixels, 128×2048 pixels, 2048×128 pixels, and 1024×256 pixels, having the same size, may be used. Yet alternatively, paper fingerprint obtaining patterns having a size different from the size described above may be used.

Assuming that a paper fingerprint-obtaining permitted area composed of 2100×2100 pixels exists in a region not including end regions of the sheet in the data representing a paper fingerprint of a sheet of document, in an embodiment, it is possible to allocate 16 areas of the paper fingerprint obtaining pattern. Furthermore, assuming that a paper fingerprint-obtaining permitted area composed of 800×2100 pixels exists, in an embodiment, it is possible to allocate 4 areas of the paper fingerprint obtaining pattern.

In the case of an alternative embodiment described above, regarding the above example of the paper fingerprint-obtaining permitted area composed of 800×2100 pixels, it is possible to allocate 4 areas of the paper fingerprint obtaining pattern composed of 512×512 pixels and 2 areas of the paper fingerprint obtaining pattern composed of 256×1024 pixels. It is also possible to allocate 6 areas of the paper fingerprint obtaining pattern composed of 256×1024 pixels. Furthermore, it is also possible to allocate 6 areas of the paper fingerprint obtaining pattern composed of 128×2048 pixels.

In this process, information representing the positions of the allocated paper fingerprint obtaining patterns is recorded in an embodiment. In the case of an alternative embodiment, additionally, information representing the shapes of the allocated paper fingerprint obtaining patterns is recorded.

Then, in step 904, a paper fingerprint intensity is calculated. The paper fingerprint intensity can be classified into five ranks A to E. The paper fingerprint intensity is determined on the basis of the number of the paper fingerprint obtaining pattern areas calculated in step 903, or the number and the individual positions of the areas. In an embodiment, a point of 0.5 is assigned to each paper fingerprint obtaining pattern area in a peripheral region of the sheet, and a point of 1.0 is assigned to each paper fingerprint obtaining pattern area in a non-peripheral region of the sheet, and the paper fingerprint intensity of the sheet of document is determined according to a total point. Furthermore, on the basis of the value of the paper fingerprint intensity, a rank of the paper fingerprint intensity (information representing a security level according to the number of registered paper fingerprints) is determined, as shown in FIG. 10. FIG. 10 is a diagram showing relationship between points of the calculated paper fingerprint intensity and ranks thereof.

In an embodiment, for example, if 15 areas having the predetermined shape of the paper fingerprint obtaining pattern exist in the peripheral region, a total point is calculated as 15×0.5=7.5. If 11 areas exist in the peripheral region and 3 areas exist in the non-peripheral region, a total point is calculated as 11×0.5+3×1=8.5.

Although a point of 0.5 is assigned to each paper fingerprint obtaining pattern area in the peripheral region and a point of 1 is assigned to each paper fingerprint obtaining pattern area in the non-peripheral region in the case described above, other point values may be used. Furthermore, points and ranks may have relationship different from the relationship shown in FIG. 10.

In an alternative embodiment, it is possible to assign different points to paper fingerprint obtaining patterns having the same size but having different shapes. Also, it is possible to assign different points to paper fingerprint obtaining patterns having different sizes. For example, it is possible to assign a double point value to a paper fingerprint obtaining pattern having a double size, and to assign a half point value to a paper fingerprint obtaining pattern having a half size.

In an alternative embodiment, it is possible to define paper fingerprint obtaining patterns having a plurality of shapes. In this case, it is to be understood that the paper fingerprint obtaining patterns are allocated optimally so that the combination of the shapes of the paper fingerprint obtaining patterns maximizes the point value. For example, when a large point value is assigned to the shape of 512×512 pixels, paper fingerprint obtaining patterns are allocated so that a maximum number of areas of the paper fingerprint obtaining pattern of 512×512 pixels is allocated. For example, first, areas of the paper fingerprint obtaining pattern of 512×512 pixels are determined, and then areas of a paper fingerprint obtaining pattern corresponding to a second largest point value are determined in the remaining region. Furthermore, areas of a paper fingerprint obtaining pattern corresponding to a third largest point value are determined in the remaining region.

Furthermore, it is possible to assign different point values to a paper fingerprint obtaining pattern area located in an end region of the sheet and having a shape extended along an end of the sheet and a paper fingerprint obtaining pattern area located in an end region of the sheet and having a shape extending toward the center of the sheet. Usually, a larger point value is assigned to the latter.

With a sheet of document having a paper fingerprint intensity of rank A, even when a paper fingerprint region is damaged due to dirt, crease, added writing, etc., it is possible to check originality in other paper fingerprint regions. Thus, a sheet of document having a paper fingerprint intensity of rank A is suitable for an important document. As the paper fingerprint intensity decreases to ranks B, C, and D, the risk of error due to dirt, crease, added writing, etc. increases, so that suitability for an important document decreases. A sheet of document of rank E is exceptional in that no paper fingerprint obtaining pattern area exists, so that there exists a possibility that it is not possible to obtain paper fingerprint information with which matching can be checked reliably. For example, a sheet of document of rank E is a colored sheet, or a sheet on which a background, a copy-forgery-inhibited pattern, or the like is drawn over the entire surface. Since it is not possible to obtain a paper fingerprint from a sheet of document of rank E, it is not possible to ensure the originality of a sheet of document of rank E.

Then, in step 905, paper fingerprint information is obtained. The paper fingerprint information includes information of the individual paper fingerprint obtaining pattern areas calculated and allocated in step 903 (coordinates of the individual areas where paper fingerprints are obtained), and grayscale images corresponding to the individual areas (i.e., paper fingerprint images in the narrow sense). Furthermore, the paper fingerprint intensity or rank information of the sheet of document determined in step 904 is obtained as paper fingerprint information of the sheet of document.

Now, paper fingerprint-area information will be described. For example, in an embodiment, since only areas of 512×512 pixels are used as paper fingerprint obtaining pattern areas, information regarding the shapes of paper fingerprint obtaining patterns is not needed. However, in other embodiments, for example, when paper fingerprint obtaining pattern areas having a plurality of shapes can be used, information representing the shapes of the individual paper fingerprint obtaining patterns is needed. In this case, when the shapes of the paper fingerprint obtaining patterns are rectangular with the edges thereof extending in parallel to the edges of the sheet of document, instead of the information representing the shapes of the individual paper fingerprint obtaining patterns, information representing the coordinates of the top left corner and bottom right corner of each of the shapes of the paper fingerprint obtaining patterns may be used.

In an embodiment, the grayscale image data and the mask data are transferred from the paper fingerprint-information obtaining unit 507 to the RAM 302 via a data bus (not shown).

The paper fingerprint-information obtaining process that is executed using the paper fingerprint-information obtaining unit 507 has been described above with reference to FIG. 9. However, the CPU 301 can execute a similar process on image data input from an external scanner via the LAN or WAN, using processing elements provided. In this case, a program that causes the CPU 301 to execute functions similar to the functions of the paper fingerprint-information obtaining unit 507 plays the role of the paper fingerprint-information obtaining unit 507.

Furthermore, it is possible to transfer image data input from outside to the printer 14 so that the image data is output by the printer 14. In this case, when extracting a paper fingerprint-obtaining permitted area, mask data is created by setting "1" to each pixel having an intensity of zero or an intensity corresponding to a white level of the sheet and setting "0" to each pixel not having an intensity of zero or an intensity corresponding to the white level of the sheet. Furthermore, in this case, in step 905 described earlier, a substantially meaningless paper fingerprint image is saved. However, advantageously, it is possible to determine a paper fingerprint intensity in advance without printing the image data that is to be printed by the printer 14.

The paper fingerprint-information obtaining process in an embodiment, and processes in other embodiments of the present invention have been described above in detail.

Referring back to FIG. 8, then, in step 803, it is checked whether the paper fingerprint intensity that has been calculated corresponds to rank A. When the paper fingerprint intensity corresponds to rank A, the process proceeds to step S804, in which the paper fingerprint information is registered in an external database (not shown). The process is then exited.

At the time of the registration, in association with the paper fingerprint information, the mask data of the original document, or portions of the image of the region of mask data with the value of 0 (i.e., an image exists) is registered in the external database. The portions of the image are chosen so that the image can be readily identified, such as image data of the four corners of the mask data.

The paper fingerprint information can be registered using a management number issued by the database.

When it is determined in step 803 that the rank of the paper fingerprint intensity is one of B to E, the process proceeds to step 805. In step 805, the paper fingerprint intensity is displayed on the operating unit 12, and the process waits for an instruction from the user. As shown in FIG. 11, the user can select one of "Cancel", "Change layout automatically", and "Continue".

FIG. 11 is an illustration showing an example of a display screen presenting the paper fingerprint intensity to the user. When "Cancel" button is selected, the process is stopped (data that has occurred is deleted) and exited. When "Change layout automatically" button is selected, the process proceeds to step 808, in which the image read is step 801 is reduced. The reduction ratio is determined so that a margin of 512 pixels is provided in the periphery of the image. The reduced image is transferred to the printer 14 and the reduced image is printed. The process is then exited. The user can execute the paper fingerprint-information registering process using the output sheet as an original. When "Continue" button is selected, the process proceeds to step 810, in which it is checked whether the rank of the paper fingerprint intensity is rank E. When the rank of the paper fingerprint intensity is rank E, i.e., when it is not possible to obtain a paper fingerprint at all, the process proceeds to step 811. In step 811, a message indicating the failure to obtain a paper fingerprint is displayed on the operating unit 12, as shown in FIG. 12. The process is then exited.

FIG. 12 is an illustration showing an example of a display screen on the operating unit 12 indicating the failure to obtain a paper fingerprint. When the rank of the paper fingerprint intensity is not rank E, the process proceeds to step 804. In step 804, the paper fingerprint information described above is registered in the external database (not shown). The process is then exited.

Operation Executed when the Tab for the Paper Fingerprint-information Comparing Process is Pressed Next, an operation that is executed when the paper fingerprint-information comparison tab 709 shown in FIG. 7 is pressed by the user and then the start key is pressed will be described with reference to FIG. 13.

FIG. 13 is a diagram for explaining a process executed by the CPU 301 or the controller unit 11 to check whether a sheet of document is an original, i.e., whether a paper fingerprint of the sheet of document is a paper fingerprint registered in the database.

In step 1301, the CPU 301 exercises control so that the scanner 13 reads a sheet of document and so that the image data obtained is transferred to the scanner-image processor 312 via the scanner I/F 311. This is the same as the processing executed in step 801 shown in FIG. 8 in an embodiment.

In step 1302, the scanner-image processor 312 executes steps 901 and 902 shown in FIG. 9 on the image data, thereby generating grayscale image data and mask data. Furthermore, the scanner-image processor attaches the mask data to the grayscale image data. The data generated is transferred to the RAM 302 via the data bus (not shown).

In step 1303, the CPU 301 executes the paper fingerprint-information comparing process. This process is executed on the basis of paper fingerprint information registered in the database and corresponding to the sheet of document read in step 1301. The paper fingerprint-information comparing process will be described with reference to FIG. 14.

Paper Fingerprint-information Comparing Process

The CPU 301 exercises control so that the paper fingerprint information retrieved from the database is compared with the grayscale image data transferred from the paper fingerprint-information obtaining unit 507 to the RAM 302 to check whether these paper fingerprints match.

FIG. 14 is a flowchart of the paper fingerprint-information comparing process executed by the CPU 301 or the controller unit 11. The steps of this flowchart are generally controlled by the CPU 301.

In step 1401, registered paper fingerprint information corresponding to the scanned sheet of document is retrieved from the external database and is stored, for example, in the RAM 302 or the HDD 304. When a large number of pieces of paper fingerprint information has been registered in the external database, candidates for matching of paper fingerprint information may be identified using mask data or image portions registered in association with the paper fingerprint information in step 804. More specifically, the mask data or image portions registered in association with the paper fingerprint information in step 804 is compared with the mask data or image portions of the sheet of document to be compared obtained in step 1302. On the basis of the degrees of matching according to the results of comparison, grayscale image data of paper fingerprint information that is to be used for matching is determined from the large number of pieces of paper fingerprint information registered in the external database.

In step 1402, the grayscale image data transferred from the paper fingerprint-information obtaining unit 507 is compared with the paper fingerprint information retrieved in step 1401 to check matching. For this purpose, a degree of matching between the two paper fingerprint images, i.e., grayscale image data, is calculated according to equation (1) given below.

The degree of matching is calculated on the basis of the paper fingerprint image represented by the grayscale image data, and the area information thereof, included in the paper fingerprint information retrieved in step 1401. First, a paper fingerprint image (grayscale image data in this case) corresponding to a paper fingerprint obtaining pattern and area information thereof are extracted. The paper fingerprint image serves as a matching-target paper fingerprint image against which matching is checked. On the basis of the area information extracted, a corresponding paper fingerprint image, i.e., grayscale image data that serves as a matching-subject paper fingerprint image that is checked for matching, is extracted from the image processed in step 1302. Matching is checked between the matching-target paper fingerprint image and the matching-subject paper fingerprint image.

The matching-subject paper fingerprint image is extracted on the basis of the area information of the matching-target paper fingerprint information. However, even if the document read in step 1301 is an original, the position of scanning at the time of registration executed in the past does not necessarily coincide with the position of scanning executed in step 1301. Thus, the matching-subject paper fingerprint image is extracted while shifting the position from the position represented by the area information extracted. Alternatively, the matching-subject paper fingerprint image is extracted by shifting the coordinates of the matching-subject paper fingerprint image so that the mask data of the matching-target paper fingerprint image and the matching-subject paper fingerprint image coincide each other. However the mask data of the matching-target paper fingerprint image and the matching-subject paper fingerprint image rarely coincide each other completely. Thus, the matching-subject paper fingerprint image is extracted while shifting the position from the position represented by the area information extracted. Equation (1) is calculated between the matching-target paper fingerprint image and the matching-subject paper fingerprint image extracted from the grayscale image data generated in step 1302 as described above. Equation (1) represents a matching error.

$$E = \frac{\sum_{x,y} \{f_1(x, y) - f_2(x, y)\}^2}{n \times m} \quad (1)$$

In equation (1), f1(x, y) denotes grayscale image data in the registered paper fingerprint information retrieved in step 1401. f2(x, y) denotes image data in a paper fingerprint area extracted from the grayscale image data in the paper fingerprint information transferred from the paper fingerprint-information obtaining unit 507 and just picked up in step 1402. (x, y) denotes coordinates in the matching-target or matching-subject image with reference to the image area. n×m indicates that a range relevant to matching is an area of horizontally n×vertically m pixels.

The numerator in equation (1) is a sum of the squares of the differences between the grayscale image data in the registered paper fingerprint information and the grayscale image data in the paper fingerprint information just picked up for all the pixels relevant to matching.

That is, as the number of pixels for which f1(x, y) and f2(x, y) are similar increases, the error E decreases.

The denominator in equation (1) serves to normalize the error E so that the error E does not depend on the number of pixels, since the numerator represents a calculation that is proportional to the number of pixels.

First, equation (1) is calculated for each of the pixels (x, y) in the matching-target image to calculate an error E. Then, an error E is calculated with a matching-subject image that is extracted with a shift of one pixel from the grayscale image data in the paper fingerprint information transferred from the paper fingerprint-information obtaining unit 507 and just picked up. The process of calculating an error E with a shift of one pixel, i.e., a process of calculating an error E with a matching-subject image extracted with a shift of one pixel from the grayscale image data, is repeated until the amount of shift reaches a predetermined amount of shift. Usually, the amount of shift is defined as a range of shift of the extracted area information by a predetermined number of pixels upward, downward, leftward, and rightward. In the end, a plurality of errors E is obtained. Of the plurality of errors E, a minimum error E is obtained.

Then, the minimum error E is evaluated in the following manner. The minimum error E is evaluated by calculating a degree of matching indicating how approximate the two pieces of paper fingerprint information are. For example, the degree of matching is calculated on the basis of relationship between the minimum error E and an error with a matching-subject image extracted with a shift of d (d=1, 2, ... ) pixels vertically, horizontally, or diagonally (hereinafter referred to as a neighbor error) relative to the position of extraction associated with the minimum error E. First, the average between the neighbor errors and the minimum error is calculated, and the neighbor errors and the minimum error are individually subtracted from the average to obtain a new set of the absolute values of the differences. The individual values in the new set are divided by a standard deviation of the new set to obtain a set of quotients. A maximum value in the set of quotients is determined as the degree of matching. In this case, the maximum value in the set of quotients is derived from the minimum error E. When the maximum value is large, it is indicated that the minimum error E is particularly small in the set of errors including the neighbor errors.

In step 1403, the degree of matching between the two pieces of paper fingerprint information, obtained in step 1402, is compared with a predetermined threshold. When the degree of matching is greater than or equal to the threshold, the degree of matching is determined as valid. On the other hand, when the degree of matching is less than the threshold, the degree of matching is determined as invalid. The evaluation on the basis of the threshold is based on the assumption that if the two images used for matching have been obtained from the same sheet, the minimum error is supposed to be considerably smaller than the neighbor errors.

Referring back to FIG. 13, in step 1304, the CPU 301 exercises control so that a result of the paper fingerprint comparing process (valid or invalid) is displayed on the display screen of the operating unit 12.

The calculation or ranking of the paper fingerprint intensity in an embodiment may be based on the image pattern of the paper fingerprint itself, as well as the positions and number of paper fingerprint obtaining areas.

For example, when the overall luminance of a paper fingerprint-obtaining permitted area exceeds a predetermined threshold corresponding to an ordinary sheet or the like suitable for matching of paper fingerprints, or when variation in the overall luminance in a paper fingerprint-obtaining permitted area is less than or equal to a predetermined level, it is determined that the sheet is not suitable for matching of paper fingerprints, so that rank E is assigned. This occurs depending on the material of the sheet, such as a sheet having a shiny surface.

Although embodiments have been described above assuming that an original document has already been prepared in advance, as described as alternative embodiments, the present invention can be applied to cases where an original document is newly created.

For example, the present invention can be applied to a case where file data created by a word processor or the like is to be printed and a printed sheet is to be managed as an original. In this case, a paper fingerprint intensity can be presented by analyzing the file data to be printed, identifying a paper fingerprint obtaining permitted area by the method described earlier, and calculating a paper fingerprint intensity of each page. When the intensity of each page is not a desired intensity, the user can change the layout or the like of the page using the word processor or the like so that the intensity is calculated and presented again. By repeating this process for each page, the file data can be configured so that each page has a desired intensity.

When the process shown in FIG. 8 is executed with a sheet on which the file data prepared as described above has been printed, for example, the process directly proceeds from step 803 to step 804.

As described above, when a user obtains a paper fingerprint, it is reported to the user whether it is possible to obtain a paper fingerprint with a sufficient intensity, or a paper fingerprint with a sufficient intensity has been obtained. Thus, when the reliability of assurance of originality is low, the user is given a chance to change the layout or the like so that the reliability of assurance of originality can be improved. The change of the document layout refers to, for example, reducing character sizes or line spaces so that a blank region for obtaining a paper fingerprint is allocated. Furthermore, when the sheet material prohibits obtaining of a paper fingerprint with a sufficient intensity, as in the case of a coated sheet, it is reported to the user that it is not possible to obtain of a paper fingerprint with a sufficient intensity. Thus, the user can choose a sheet of a different material for printing, and instruct registration of a paper fingerprint using the sheet as an original.

Furthermore, when it is determined that the reliability of the assurance of originality of the sheet of document is low, the document is converted into a sheet of document that can assure originality reliably. Thus, the possibility of failure of originality assurance after registration is reduced.

It is prevented to process a sheet of document with low reliability of original assurance as an original. Thus, it is readily possible to prepare an original that allows reliable assurance of the originality of the sheet on the basis of a paper fingerprint (a feature of fiber pattern) obtained by scanning the sheet.

Furthermore, when the original prepared in advance is distributed to a person relevant to the original, and when it is to be checked at a later date whether a certain sheet of document is the original distributed previously, it is possible to assure the originality with a high probability if the sheet of document is the original. On the other hand, if the sheet of document is not the original, it is possible to determine with a high probability that the sheet of document is not the original.

The present invention can be applied to either a system composed of a plurality of apparatuses (e.g., a scanner, a personal computer, a printer, and so forth), or a standalone apparatus (a multifunction apparatus, a printer, a facsimile machine, or the like).

Furthermore, it is possible to implement the present invention by allowing a computer to read and execute program code stored on a storage medium, the program code representing the procedures in the flowcharts described above. In this case, the functions of the present invention are embodied by the program code read from the storage medium. Thus, the program code and the storage medium storing the program code fall within the scope of the present invention.

The storage medium for supply the program code may be, for example, a floppy disk, a hard disk, an optical disk, a magneto-optical disk, a CD-ROM, a CD-R, a magnetic tape, a non-volatile memory card, or a ROM.

Furthermore, the functions of the embodiments described above may be embodied by the computer reading and executing the program code. Furthermore, the functions of the embodiments may be embodied by causing an operating system (OS) or the like running on the computer to execute actual processing in part or in entirety according to the instructions of the program code.

Furthermore, the program code read from the storage medium may be written in a memory of a unit in the computer so that a CPU or the like of the unit executes actual processing in part or in entirety according to instructions of the program code. The functions of the embodiments can also be embodied in this manner. The unit in the computer may be a function extension board or a function extension unit connected to the computer.

As described above, it is prevented to process a sheet of document with low reliability of original assurance as an original. Thus, it is readily possible to achieve reliable assurance of the originality of the sheet on the basis of a paper fingerprint (a feature of fiber pattern) obtained by scanning the sheet.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-328524 filed Dec. 5, 2006, which is hereby incorporated by reference herein in its entirety.

What is claimed is:

1. An image processing apparatus comprising:
    a data obtaining unit configured to obtain data representing a sheet of document;
    a calculating unit configured to determine an area where it is possible to obtain a paper fingerprint from the obtained data representing the sheet of document, and to calculate a paper fingerprint intensity of the sheet of document based on a number of areas of one or more paper fingerprint obtaining patterns allocated in the area where it is possible to obtain a paper fingerprint; and
    a paper fingerprint intensity reporting unit configured to report a result of the calculation,
    wherein the data of the sheet of document is compared with a threshold, and an area of the sheet of document having a luminance greater than or equal to a predetermined luminance is determined to be the area where it is possible to obtain the paper fingerprint.

2. The image processing apparatus according to claim 1, wherein the data obtaining unit is configured to obtain image data obtained by scanning the sheet of document.

3. The image processing apparatus according to claim 1, wherein the data obtaining unit is configured to obtain image data input from an external device via a communication circuit.

4. The image processing apparatus according to claim 1, wherein the paper fingerprint obtaining patterns include a plurality of types of paper fingerprint obtaining patterns that differ from each other in at least one of size and shape,
    wherein at least one of positions or types of the individual allocated areas of the paper fingerprint obtaining patterns are calculated by repeating a process of allocating one of the plurality of types of paper fingerprint obtaining patterns in the area where it is possible to obtain a paper fingerprint, and
    wherein the paper fingerprint intensity of the sheet of document is calculated on the basis of the positions and/or types of the individual areas of the paper fingerprint obtaining patterns.

5. The image processing apparatus according to claim 1, wherein the paper fingerprint intensity reporting unit is configured to report the paper fingerprint intensity.

6. The image processing apparatus according to claim 1, wherein the paper fingerprint intensity reporting unit is configured to alert information to a user when the paper fingerprint intensity is less than a threshold.

7. The image processing apparatus according to claim 1, further comprising a checking unit configured to check whether the sheet of document has a predetermined variation.

8. The image processing apparatus according to claim 2, further comprising a layout changing unit configured to reduce the image data obtained by the data obtaining unit,
    wherein the paper fingerprint intensity reporting unit is configured to issue a query as to whether a layout changing process for achieving a predetermined paper fingerprint intensity is to be executed by the layout changing unit, and wherein the layout changing process is executed when an instruction for execution of an automatic layout changing process is received from the user.

9. A method comprising:

obtaining data representing a sheet of document;

determining an area where it is possible to obtain a paper fingerprint from the obtained data representing the sheet of document;

calculating a paper fingerprint intensity of the sheet of document based on a number of areas of one or more paper fingerprint obtaining patterns allocated in the area where it is possible to obtain a paper fingerprint; and reporting a result of the calculation, wherein the data of the sheet of document is compared with a threshold, and an area of the sheet of document having a luminance greater than or equal to a predetermined luminance is determined to be the area where it is possible to obtain the paper fingerprint.

10. The method according to claim 9, wherein the obtaining the data representing the sheet of document comprises scanning the sheet of document.

11. The method according to claim 9, wherein the obtaining the data representing the sheet of document comprises receiving the data from an external device via a communication circuit.

12. The method according to claim 9, wherein the paper fingerprint obtaining patterns include a plurality of types of paper fingerprint obtaining patterns that differ from each other in at least one of size and shape, wherein at least one of positions or types of the individual allocated areas of the paper fingerprint obtaining patterns are calculated by repeating a process of allocating one of the plurality of types of paper fingerprint obtaining patterns in the area where it is possible to obtain a paper fingerprint, and wherein the paper fingerprint intensity of the sheet of document is calculated on the basis of the positions and/or types of the individual areas of the paper fingerprint obtaining patterns.

13. The method according to claim 9, wherein the reporting comprises reporting the paper fingerprint intensity.

14. The method according to claim 9, wherein the reporting comprises reporting alert information to a user when the paper fingerprint intensity is less than a threshold.

15. The method according to claim 9, further comprising checking whether the sheet of document has a predetermined variation.

16. The method according to claim 10, further comprising:

issuing a query as to whether a layout changing process for achieving a predetermined paper fingerprint intensity is to be executed; and executing the layout changing process when an instruction for execution of a layout changing process is received from the user.

17. The method according to claim 16, wherein the layout changing process is used to reduce the image data obtained by scanning the sheet of document.

18. A non-transitory computer readable medium storing instructions which, when executed by an apparatus, causes the apparatus to execute operations comprising:

obtaining data representing a sheet of document;

determining an area where it is possible to obtain a paper fingerprint from the obtained data representing the sheet of document;

calculating a paper fingerprint intensity of the sheet of document based on a number of areas of one or more paper fingerprint obtaining patterns allocated in the area where it is possible to obtain a paper fingerprint; and reporting a result of the calculation, wherein the data of the sheet of document is compared with a threshold, and an area of the sheet of document having a luminance greater than or equal to a predetermined luminance is determined to be the area where it is possible to obtain the paper fingerprint.

* * * * *